United States Patent
Neal

(10) Patent No.: US 9,581,722 B2
(45) Date of Patent: Feb. 28, 2017

(54) APPARATUS AND METHOD FOR NONINVASIVELY DETERMINING POSITIONING OF A COMPONENT BENEATH A SUBSTRATE

(71) Applicant: Matthew Neal, Palmdale, CA (US)

(72) Inventor: Matthew Neal, Palmdale, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/728,716

(22) Filed: Jun. 2, 2015

(65) Prior Publication Data

US 2016/0356916 A1     Dec. 8, 2016

(51) Int. Cl.
*G01V 5/00* (2006.01)
*B64F 5/00* (2006.01)
*F16B 1/00* (2006.01)

(52) U.S. Cl.
CPC .......... *G01V 5/0075* (2013.01); *B64F 5/0045* (2013.01); *F16B 1/0071* (2013.01)

(58) Field of Classification Search
USPC ........................................................ 250/305
See application file for complete search history.

(56) References Cited

U.S. PATENT DOCUMENTS 3,673,860 A * 7/1972 Flaherty ............. G01N 29/0618
250/358.1
6,282,260 B1 * 8/2001 Grodzins ............... G01N 23/20
378/137

8,056,862 B1 * 11/2011 Tomerlin ................. B64C 1/38
244/159.1
(Continued)

FOREIGN PATENT DOCUMENTS

DE         19854335 A1   6/2000
EP          2481935 A1   8/2012
WO      WO 02/04174 A1   1/2002

OTHER PUBLICATIONS

Guzman, et al.: "*A Non-Destructive Method to Classify the Correct Installation of Blind Bolts*", SAE Int. J. Mater. Manf 7(1):2014, doi:10.4271/2013-01-2184; pp. 45-57.

(Continued)

*Primary Examiner* — Phillip A Johnston
(74) *Attorney, Agent, or Firm* — Tarolli, Sundheim, Covell & Tummino LLP

(57) ABSTRACT

A method of noninvasively determining desired positioning of a component beneath a substrate is described. The component has a concealing surface longitudinally separated by a substrate body from an accessible surface of the substrate. A component having longitudinally differing activated and deactivated positions is provided. The component is located longitudinally beneath the concealing surface of the substrate. The accessible surface of the substrate is inspected with an inspection device while the component is beneath the concealing surface. With the inspection device, at least one of an activated and a deactivated position of the component is detected. The detected activated and/or deactivated position of the component is indicated, in a user-perceptible format. An apparatus for noninvasively determining desired positioning of a component beneath a substrate is also provided.

22 Claims, 3 Drawing Sheets

(56) References Cited

U.S. PATENT DOCUMENTS

| | | | |
|---|---|---|---|
| 8,094,781 B1* | 1/2012 | Safai | G01N 23/201 |
| | | | 378/145 |
| 8,229,064 B2* | 7/2012 | Grodzins | G01N 23/223 |
| | | | 378/44 |
| 9,062,696 B2 | 6/2015 | Demerath et al. | |
| 9,316,512 B2* | 4/2016 | Georgeson | G01D 11/30 |
| 2002/0130659 A1* | 9/2002 | Wincheski | G01N 27/9033 |
| | | | 324/235 |
| 2008/0049895 A1 | 2/2008 | Agnihotri et al. | |
| 2014/0184786 A1 | 7/2014 | Georgeson et al. | |
| 2016/0252468 A1* | 9/2016 | Lou | G01N 23/203 |

OTHER PUBLICATIONS

Smith: U.S. Appl. No. 14/593,851, filed Jan. 9, 2015, pp. 1-27.
European Search Report for corresponding EP 16 17 2759; mailed Oct. 6, 2016.

* cited by examiner

APPARATUS AND METHOD FOR NONINVASIVELY DETERMINING POSITIONING OF A COMPONENT BENEATH A SUBSTRATE

TECHNICAL FIELD

This disclosure relates to a method and apparatus for noninvasively determining positioning of a component beneath a substrate, and, more particularly, to an apparatus and method for noninvasively determining the position of a fastener embedded within a structural component.

BACKGROUND

In many industries, and for many reasons, it may be desirable to noninvasively determine, to some degree, the positioning of a component beneath a substrate, the substrate hiding the component from ordinary visual position inspections. For example, in the aircraft industry, component panels of the aircraft could be attached to a structural framework through the use of hidden fasteners. These hidden fasteners are generally concealed beneath an outer skin/surface of the aircraft panel to avoid creating unwanted irregularities in the surface of the panel which might adversely affect airflow over the surface.

One hidden fastener design is the advanced Rapid Access Panel system ("RAP"), disclosed in co-pending U.S. patent application Ser. No. 14/593,851, titled "Fluid-Actuated Fastening Device" and filed 9 Jan. 2015, which is hereby incorporated by reference in its entirety. RAP is a pneumatically actuated fastener, with the clamping assemblies linked internally so they simultaneously release or engage with application of air pressure. An RAP, or other, similar fastener, may be a relatively reliable high-strength fastener. However, the RAP fastener is generally not visible for inspections to assure that it is in the correct locking position, since it engages the panel from underneath, with no fastener indication or effect upon the top surface of the panel. It is important to be able to identify quickly and accurately that the panel has been sufficiently latched via the RAP system. Also, should a fastener fail, it is important to be able to quickly locate the damaged fastener for removal/replacement with minimal effect upon the panel system.

SUMMARY

In an embodiment, a method of noninvasively determining desired positioning of a component beneath a substrate is described. The component has a concealing surface longitudinally separated by a substrate body from an accessible surface of the substrate. A component having longitudinally differing activated and deactivated positions is provided. The component is located longitudinally beneath the concealing surface of the substrate. The accessible surface of the substrate is inspected with an inspection device while the component is beneath the concealing surface. With the inspection device, at least one of an activated and a deactivated position of the component is detected. The detected activated and/or deactivated position of the component is indicated, in a user-perceptible format.

In an embodiment, an apparatus for noninvasively determining desired positioning of a component beneath a substrate is described. The substrate has a concealing surface longitudinally separated by a substrate body from an accessible surface of the substrate. A component has longitudinally differing activated and deactivated positions. An inspection device is provided for detecting at least one of an activated and a deactivated position of the component. When the component is located longitudinally beneath the concealing surface of the substrate, the accessible surface of the substrate is inspected with the inspection device. The detected activated and/or deactivated position of the component is indicated in a user-perceptible format.

In an embodiment, a method of noninvasively determining the position of a fastener embedded within a structural component is described. A fastener having longitudinally differing latched and loose positions is provided. The fastener is placed into a predetermined position with respect to a concealing surface of the structural component. The concealing surface is longitudinally separated by a structural component body from an accessible surface of the structural component. The accessible surface of the structural component is inspected with an inspection device while the fastener is beneath the concealing surface. With the inspection device, at least one of a latched and a loose position of the fastener is detected. The detected latched and/or loose position of the fastener is indicated, in a user-perceptible format.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1:
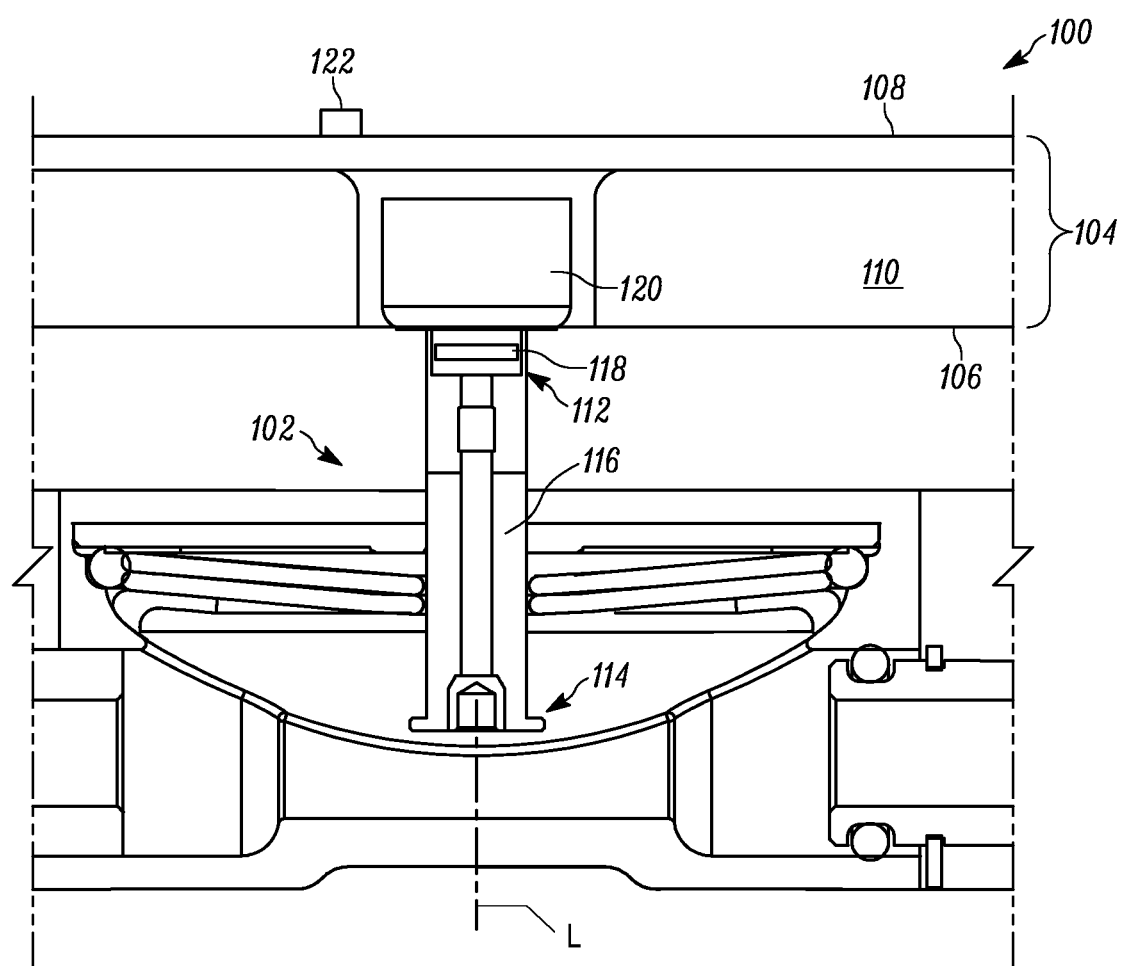
FIG. 1 is a schematic side view of one aspect of the invention.

FIG. 1 depicts an apparatus 100 for noninvasively determining desired positioning of a component 102 beneath a substrate 104. The substrate 104 has a concealing surface 106 (the lower surface, in the orientation of FIG. 1). The concealing surface 106 is longitudinally separated from an accessible surface 108 of the substrate 104 by a substrate body 110. The "longitudinal" direction, as used here, is a direction substantially parallel to longitudinal axis "L"—i.e., vertically, in the orientation of FIG. 1. The terms "top", "bottom", "above", "below", "underneath", "beneath", and similar directional indications are all based upon the orientation of FIG. 1. The term "noninvasive" is used herein to indicate that the component 102 and the substrate 104 are substantially physically unaltered by the determination process. For example, while it may be desirable to wipe a lubricant (not shown) or other "temporary" substance from the substrate 104 before testing, a "noninvasive" test will not require the removal of a "permanent" substance, such as paint (not shown) from the substrate 104. However, it is contemplated that, for some use environments of the apparatus 100, the component 102 and/or substrate 104 may come into incidental, nondamaging contact with some testing-related structure during the testing process.

For many use environments, at least a portion of the substrate 104 will be substantially opaque or otherwise configured/operative to conceal the underlying component 102 from being readily perceived by a user. For example, the substrate 104 may be at least a portion of a composite aircraft panel, and will be presumed to be such for the sake of the below discussion. However, it is contemplated that the apparatus 100 may be used to noninvasively determine desired positioning of a component with respect to a substrate, even if the component is not beneath the substrate and/or even if the component is readily visible to a user. One of ordinary skill in the art will be able to provide a suitable apparatus 100 and corresponding method of use for any desired position-determining task, based upon the technology disclosed herein.

Figure 2:
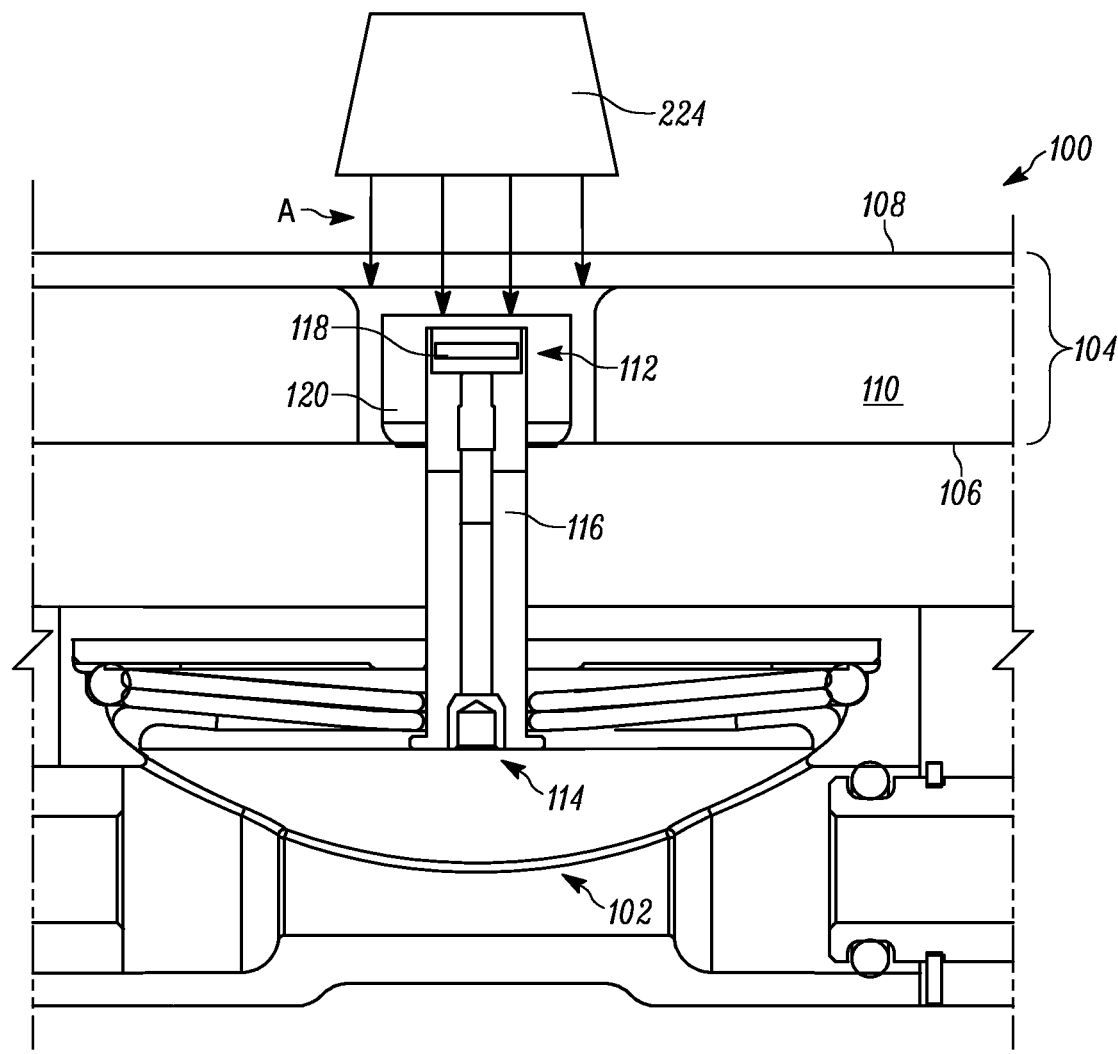
FIG. 2 is a schematic side view of the aspect of FIG. 1 in a first operational configuration.

As shown in FIG. 1, the apparatus 100 includes a component 102. The component 102 has longitudinally differing activated and deactivated positions. For example, the aforementioned RAP fastener is very similar to the component 102 shown in the Figures, and then below description will presume that the component 102 is an RAP or other, similar fastener interacting with a composite aircraft panel as a substrate 104. Here, the component 102 shown has upper and lower component portions 112 and 114, respectively, separated by a component stem 116. The component stem 116 is configured to move longitudinally between deactivated (lowered, as in FIGS. 1 and 3) and activated (raised, as shown in FIG. 2) positions. As the apparatus 100 is agnostic and indifferent as to the precise mechanism of the fastening or latching of the component 102, no specific description of such will be provided here.

Figure 3:
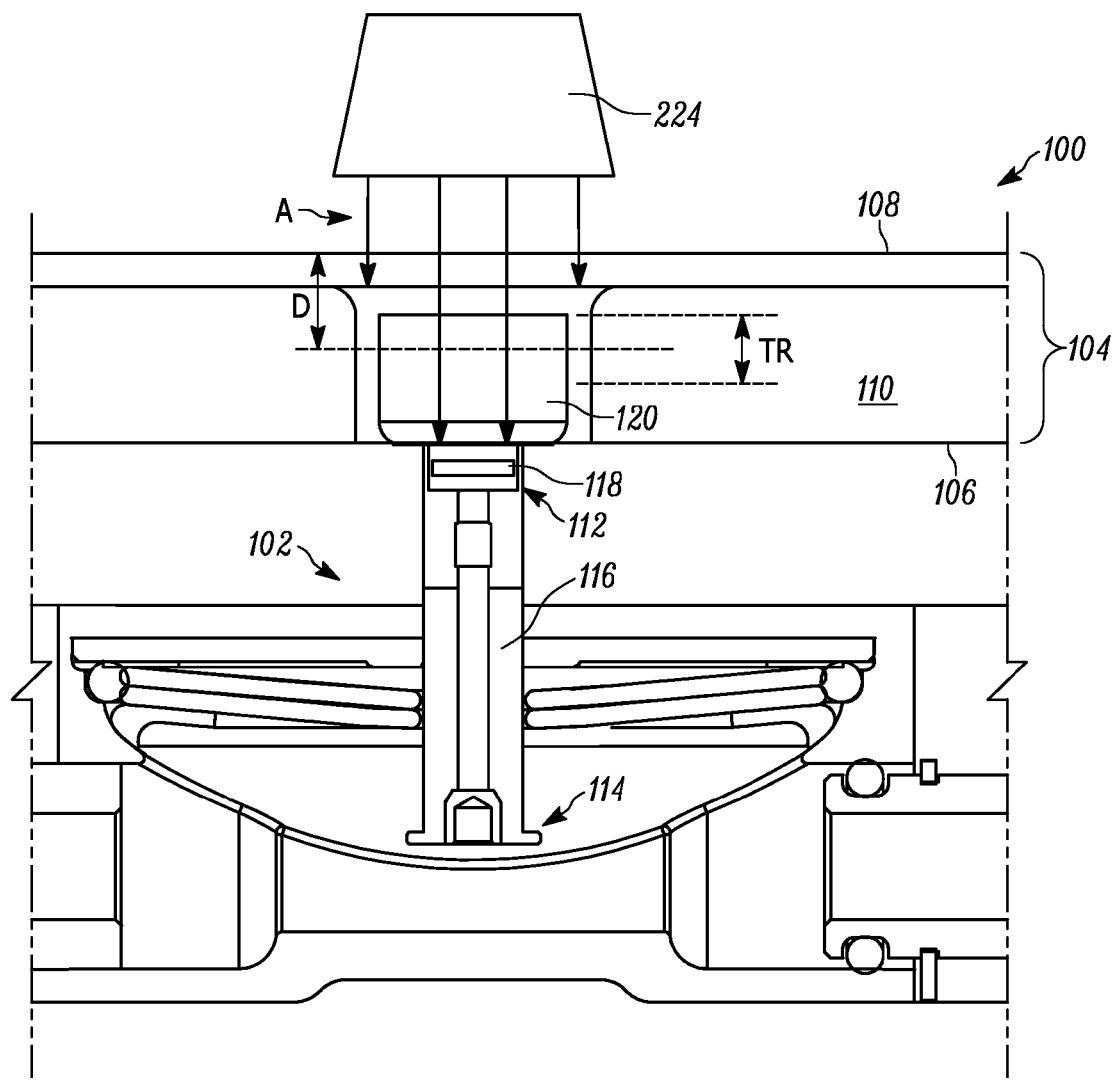
FIG. 3 is a schematic side view of the aspect of FIG. 1 in a second operational configuration.

Generally, though, the component 102 may be placed longitudinally beneath the concealing surface 106 of the substrate 104 by the component 102 being brought, in the deactivated position, into a predetermined relationship with the concealing surface 106 of the substrate 104. In the example of the Figures, the component 102 in FIG. 3 is a de-energized RAP fastener located in a predetermined position beneath, and ready to engage, a substrate 104 which is a composite aircraft panel. The component 102 is then maintained in the predetermined relationship with the concealing surface 106 of the substrate 104. Finally, the component 102 is adjusted, in any suitable manner, toward the activated position. This adjustment occurs within that predetermined relationship with the concealing surface 106 of the substrate 102; for example, the component 102 is not moved laterally away from the predetermined relationship. (Here, "laterally" is used to indicate a direction within a plane substantially perpendicular to the longitudinal direction.) In the example of the Figures, the RAP fastener is energized, such as pneumatically, to extend the component body 116 longitudinally upward and toward a desired engagement with the substrate body 110.

The adjustment of the component 102 is described herein as being "toward", not "into", the activated position because the actual achievement, and maintenance, of that activated position could be thwarted by any number of factors including incorrect alignment, loss of energization, structural failure, fatigue, environmental factors, localized damage due to debris strike, weapons damage, collision, and/or any other mishap or error in the adjustment process. In addition, it is possible that a once-activated component 102 could fall out of activation and into a deactivated position (i.e., could "fail"). The noninvasive position determination of the present apparatus 100 and method can be used to assist with detecting never-activated and/or failed components 102, as well as with confirming desired activation of components 102, in such a manner as to quickly facilitate repairs and inspections.

In addition, it is also contemplated that the noninvasive position determination of the present apparatus 100 and method can be used to assist with detecting "still-activated" components 102 when such is not desirable. For example, the apparatus 100 and method could be used to detect a fastener that is jammed in the latched position during panel removal—i.e., instead of looking for the fastener that didn't latch, the apparatus 100 and method could be used to look for the fastener that didn't unlatch.

Optionally, the component 102 may include a detectable marker 118, which can be used in the noninvasive determination of the component 102 position, as will be described below. The detectable marker 118 can be have any desired type, material, configuration, position, shape, or other physical property, and may be provided, at any desired position with respect to the component 102, in any desired manner by one of ordinary skill in the art. For example, when the determination process is at least partially accomplished using a radiation-type detector, the detectable marker 118 could be radiopaque, such as by being at least partially made from a radiation-shielding material such as lead and/or a heavy alloy. A "heavy alloy" is a relatively high-density material; "heavy" is used in the art to indicate molecular structure, rather than necessarily a physical weigh. Examples of "heavy alloys" include tungsten-group sintered alloys including tungsten and a binder phase with nickel, copper, iron, or another binder substance. Other possible "heavy alloys" which could be used in the described aircraft panel use environment include neodymium and samarium. For certain use environments, it may be desirable to have the "heavy alloys" be significantly different in composition from surrounding structures, which may lead to the selection of materials other than iron or nickel for some steel use environments, for example.

As shown in FIG. 1, the concealing surface 106 of the substrate 104 could include a component-accepting structure 120 for accepting the component 102 in a longitudinally adjustable relationship therewith. For example, the component-accepting structure 120 shown in the Figures is a "blind hole" extending into the substrate body 110 from the underside (concealing surface 106) of the substrate 104, but which does not penetrate completely through to the accessible surface 108 of the substrate 104. The component-accepting structure 120 may be in a predetermined location on the concealing surface 106 for assisting with accepting an RAP fastener into an activated position, for example.

Particularly when at least a portion of the substrate 104 is opaque, the apparatus 100 may include a user-perceptible component position indicator (shown schematically at 122) on the accessible surface 108 of the substrate 104 at a location longitudinally correlated with the component-accepting structure 120. The component position indicator 122 need not be directly overlying the component-accepting structure 120, but could be at a predetermined offset therefore, as desired. The component position indicator 122 may be of any desired type sufficient to communicate to a user the position of a component-accepting structure 120. For example, the small stub shown in FIG. 1 could be configured to physically interact with another element of the apparatus 100 (e.g., a detector) to position that element appropriately for desired position determination. As another example, and particularly for use environments wherein the accessible surface 108 is desirably smooth, the component position indicator 122 could be a painted symbol or other mark which provides a visual difference from adjacent areas of the accessible surface 108. A suitable component position indicator 122 could readily be provided by one of ordinary skill in the art to substantially indicate the position of a component-accepting structure 120 for a particular use environment.

Turning to FIG. 2, the apparatus 100 further includes an inspection device 224 for detecting at least one of an activated and a deactivated position of the component 102. The inspection device 224 may be of any suitable type sufficient to perform the described detection. For example, the inspection device 224 may be a "sonar" or other time-of-flight instrument having sufficient precision to detect a location of an uppermost end surface of the upper component portion 112 when in the activated and/or deactivated positions.

As another example of detection, and when the component 102 includes a detectable marker 118, the inspection device 224 could detect at least one of the activated and deactivated positions of the component by detecting a longitudinal position of the detectable marker 118 with respect to the accessible surface 108 of the substrate 104. E.g., when the detectable marker 118 is radiopaque, the inspection device 224 could be a radiation-sensitive inspection device.

In order to noninvasively perform the determination of desired positioning of a component 102 which is located at least partially longitudinally beneath the concealing surface 106 of the substrate 104, the accessible surface 108 of the substrate 104 can be inspected with the inspection device 224. The inspection device 224 detects the position of the component 102, as will be described below, and then indicates, in a user-perceptible format, the detected activated and/or deactivated position of the component 102. For example, a visual, audible, tactile, or other user-perceptible indication of position could be provided in real time and/or could be recorded for later review. The user-perceptible indication of position could be a simple binary activated/deactivated indication (e.g., go/no-go light, on/off buzzer, or the like), and/or could include some scaled or graduated indication of the relative location of the component 102 with respect to the inspection device 224 (e.g., distance readout, escalating-frequency beeping, or the like). The user-perceptible indication could be absolute or relative (to any desired standard), and may be chosen for a particular use environment of the apparatus 100 by one of ordinary skill in the art.

Stated differently, the inspection device 224, when placed above the substrate 104, may be configured to detect at least one of an activated and a deactivated position of the component 102 located beneath the substrate 104 by detecting a longitudinal position of at least a portion of the component 102 with respect to the accessible surface 108 of the substrate 104. For example, when the component 102 is provided with a detectable marker 118, the inspection device 224 could detect the longitudinal position of the detectable marker 118 with respect to the accessible surface 108 of the substrate 104. However, any surface, structure, or other physical location on the component 102 could be similarly detected with a suitable inspection device 224, even if the detectable marker 118 is not provided. This longitudinal position detection might be helpful, for example, when a graduated or scaled number is desired for the distance of the component 102 beneath the substrate 104 as an indication of the activated or deactivated position.

As another example of the operation of the apparatus 100, the inspection device 224 may be configured to detect at least one of an activated and a deactivated position of the component 102 located beneath the substrate 104 by detecting at least one of the presence and absence of at least a portion of the component 102 within a predetermined distance from the accessible surface 108 of the substrate 104. An example of this sort of "allowable distance" detection is shown in FIG. 3. The predetermined distance D might be, for example, an effective range over which the inspection device 224 has an acceptably high degree of accuracy in detecting a detectable marker 118 or another predetermined structure of the component 102. This allowable distance detection may be helpful, for example, when a binary "yes/no" indication of the presence or absence of the component 102 within a certain proximity D to the accessible surface 108 is desired.

Yet another example of the operation of the apparatus 100 includes providing the component 102 with the detectable marker 118. Then, in order to detect the activated position of the component 102, the inspection device 224 is used to detect the presence of the detectable marker 118 within a target range TR longitudinally beneath the accessible surface 108. This "target range" detection may be helpful, for example, when the detectable marker 118 is not at an extreme upper end of the component 102 and/or when the component 102 is capable of being undesirably "overtightened" (e.g., placed into too-deep engagement with the substrate body 110). In this target range detection, then, the presence of the detectable marker 118 within the target range TR indicates to the inspection device 224 that the component 102 is in the activated position, while the presence of the detectable marker 118 outside the target range TR (e.g., the detectable marker 118 being located longitudinally above or below the target range TR, which can also be thought of as the absence of the detectable marker 118 from the target range TR) indicates to the inspection device 224 that the component 102 is out of the activated position (i.e., is in a deactivated position).

The operation of the apparatus 100 and method will now be described with reference to FIGS. 2 and 3, where the component 102 is an RAP fastener and the substrate is a structural component, such as a composite aircraft panel. In the below description, the "activated" position could be considered a "latched" position, and the "deactivated" position could be considered a "loose" position, which is longitudinally different from the "latched" position.

First, the component 102 is brought into a predetermined position with respect to the concealing surface 106 of the substrate 104. For example, the component 102 could be longitudinally aligned beneath the component-accepting structure 120, as shown. The relationship between the component 102 and the component-accepting structure 120 is presumed to be longitudinally adjustable, for the sake of the present description. In the depicted example of FIGS. 2-3, the component 102 (e.g., the fastener) is adjusted (e.g., energized) from the loose/deactivated position to attempt a fastening operation on the substrate 104 (e.g., the structural component) to bring the component 102 into the latched/activated position.

Once the attempt has been made to place the component 102 into the activated position, the inspection device 224 may be used, for example, to detect whether that attempt was successful. In FIG. 2, the component 102 appears to have been properly activated, with the upper component portion 112 being positioned in a predetermined relationship with the component-accepting structure 120. The inspection device 224 may use any of the previously described detection schemes, or any other desired detection schemes, to determine (directly or inferentially) at least one of an activated (e.g., latched) or deactivated (e.g., loose) position of the component 102. For the arrangement shown in FIG. 2, then, the inspection device 224 will indicate, in a user-perceptible format, that the component 102 is in an activated position.

In FIG. 3, on the other hand, the attempt to place the component 102 into the activated position has failed, and the upper component portion 112 has not engaged with the component-accepting structure 120. When inspected—using any desired detection scheme—with the inspection device 224, the FIG. 3 arrangement will indicate to the inspection device 224 that the component 102 is not, in fact, in the activated position—that is, that the component 102 is in the deactivated position. Accordingly, one of ordinary skill in the art will realize that the fastener shown in FIG. 3 has not latched as desired to the structural component, and corrective action may be taken as appropriate.

The above description uses activated and deactivated positions as an example. However, it is contemplated that the technology described above could also or instead be used to detect presence or absence of a component beneath a substrate 104 by similarly detecting whether an expected portion of the component is within, or missing from, a target range. No actual "activation" or "deactivation" of the component 102 is necessary for the apparatus 100 and method to be useful; the "activated" and "deactivated" positions are used herein merely for clarity in describing the example RAP fastener positioning inspection process.

It is contemplated that the apparatus 100 and corresponding method could be used for initial inspection and/or verification of component 102 position during or shortly after manufacture, as well as for ongoing or routine inspections to ensure the continued maintenance of a previously placed component 102 in a desired position after some desired period of use.

The inspection device 224 could be used to detect an absolute distance or position of the component 102 from the inspection device 224 itself. It is also contemplated, though, that the inspection device 224 could be used to detect relative distances between the component 102 and some other structure of the system, such as the accessible surface 108 of the substrate, as indicated by arrows A in FIGS. 2-3.

Though the lowermost (in the orientation of the Figures) surface has been designated the "concealing" surface 106 for the sake of discussion herein, it is contemplated that any structure of the substrate 104—including at least a portion of the accessible surface 108 and/or the substrate body 110—could also or instead be considered to be performing a "concealing" function as described. Any "concealment" that occurs could be partial or total, and could occur in any appropriate field of view or wavelength of considered light. That is, the component 102 could be "concealed" from visible light, but non-"concealed" under x-ray frequencies, for example.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. At least a portion of the component 102 (e.g., at least an uppermost end of the upper component portion 112) could be located within a concave (e.g., blind hole style) component-accepting structure 120, without destroying the condition of that component as being "below the concealing surface 106", at least because the sides and bottom of the blind hole would still be considered to be a part of the concealing surface 106. While an aperture or concave type component-accepting structure 120 is described above, the component-accepting structure 120 could also or instead be convex or protruding longitudinally downward from the substrate body 110. Any component could be provided with a user-perceptible marking to indicate a material, configuration, at least one dimension, or the like pertaining to that component, the user-perceptible marking aiding a user in selecting one component from an array of similar components for a particular use environment. A visual or visible element may be made perceptible in any suitable manner, including via visible light, infrared light, ultraviolet light, or the like. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

What is claimed is:

1. A method of noninvasively determining desired positioning of a component beneath a substrate having a concealing surface longitudinally separated by a substrate body from an accessible surface of the substrate, the method comprising:
   providing a component having longitudinally differing activated and deactivated positions, the component being located longitudinally beneath the concealing surface of the substrate;
   inspecting, with an inspection device from the accessible surface of the substrate the component located beneath the accessible and concealing surfaces;
   detecting, with the inspection device, at least one of an activated and a deactivated position of the component; and
   indicating, in a user-perceptible format, the detected activated and/or deactivated position of the component.

2. The method of claim 1, wherein the concealing surface of the substrate includes a component-accepting structure, and wherein providing a component includes providing a component located in a longitudinally adjustable relationship with the component-accepting structure.

3. The method of claim 2, including providing a user-perceptible component position indicator on the accessible surface of the substrate at a position longitudinally correlated with the component-accepting structure.

4. The method of claim 1, wherein providing a component includes:
bringing the component, in the deactivated position, into a predetermined relationship with the concealing surface of the substrate;
maintaining the component in the predetermined relationship with the concealing surface of the substrate; and
adjusting the component toward the activated position, within the predetermined relationship with the concealing surface of the substrate.

5. The method of claim 1, wherein providing a component includes providing a component having a detectable marker; and
wherein detecting, with the inspection device, at least one of an activated and a deactivated position of the component includes detecting a longitudinal position of the detectable marker with respect to the accessible surface of the substrate.

6. The method of claim 1, wherein detecting, with the inspection device, at least one of an activated and a deactivated position of the component includes detection, with the inspection device, at least one of the presence and absence of a portion of the component within a predetermined distance from the accessible surface.

7. The method of claim 6, wherein providing a component includes providing a component having a detectable marker; and
wherein detecting an activated position of the component includes detecting, with the inspection device, the presence of the detectable marker within a target range longitudinally beneath the accessible surface.

8. An apparatus for noninvasively determining desired positioning of a component beneath a substrate, the substrate having a concealing surface being longitudinally separated by a substrate body from an accessible surface of the substrate, the apparatus comprising:
a component having longitudinally differing activated and deactivated positions; and
an inspection device for detecting at least one of an activated and a deactivated position of the component; wherein
when the component is located longitudinally beneath the concealing and accessible surfaces of the substrate, the accessible surface of the substrate is inspected with the inspection device from the accessible surface; and wherein
the detected activated and/or deactivated position of the component is indicated in a user-perceptible format.

9. The apparatus of claim 8, wherein the concealing surface of the substrate includes a component-accepting structure for accepting the component in a longitudinally adjustable relationship therewith.

10. The apparatus of claim 9, including a user-perceptible component position indicator on the accessible surface of the substrate at a position longitudinally correlated with the component-accepting structure.

11. The apparatus of claim 8, wherein the component includes a detectable marker; and the inspection device detects at least one of an activated and a deactivated position of the component by detecting a longitudinal position of the detectable marker with respect to the accessible surface of the substrate.

12. The apparatus of claim 8, wherein the detectable marker is radiopaque, and the inspection device is a radiation-sensitive inspection device.

13. A method of noninvasively determining the position of a fastener embedded within a structural component, the method comprising:
providing a fastener having longitudinally differing latched and loose positions;
placing the fastener into a predetermined position with respect to a concealing surface of the structural component, the concealing surface being longitudinally separated by a structural component body from an accessible surface of the structural component;
inspecting, with an inspection device from the accessible surface of the structural component, the fastener located beneath the concealing and accessible surfaces;
detecting, with the inspection device, at least one of a latched and a loose position of the fastener; and
indicating, in a user-perceptible format, the detected latched and/or loose position of the fastener.

14. The method of claim 13, wherein the concealing surface of the structural component includes a fastener-accepting structure, and including:
placing the fastener in longitudinally adjustable relationship with the fastener-accepting structure; and
with the fastener, attempting a fastening operation on the structural component to bring the fastener into the latched position.

15. The method of claim 14, including providing a user-perceptible fastener position indicator on the accessible surface of the structural component at a position longitudinally correlated with the fastener-accepting structure.

16. The method of claim 13, wherein placing the fastener longitudinally beneath a concealing surface of the structural component includes:
bringing the fastener, in the loose position, into a predetermined relationship with the concealing surface of the structural component;
maintaining the fastener in the predetermined relationship with the concealing surface of the structural component; and
adjusting the fastener toward the latched position, within the predetermined relationship with the concealing surface of the structural component, to attempt a fastening operation on the structural component.

17. The method of claim 13, wherein providing a fastener includes providing a fastener having a detectable marker; and
wherein detecting, with the inspection device, at least one of a latched and a loose position of the fastener includes:
detecting a longitudinal position of the detectable marker with respect to the accessible surface of the structural component; and
at least one of correlating the presence of the fastener within the predetermined distance from the accessible surface with a latched position of the fastener and correlating the absence of the fastener within the predetermined distance from the accessible surface with a loose position of the fastener.

18. The method of claim 17, wherein the detectable marker is radiopaque, and the inspection device is a radiation-sensitive inspection device.

19. The method of claim 13, wherein detecting, with the inspection device, at least one of a latched and a loose position of the fastener includes detection, with the inspection device, at least one of the presence and absence of a portion of the fastener within a predetermined distance from the accessible surface; and including at least one of correlating the presence of the fastener within the predetermined distance from the accessible surface with a latched position of the fastener and correlating the absence of the fastener within the predetermined distance from the accessible surface with a loose position of the fastener; and indicating, in a user-perceptible format, the detected latched and/or loose position of the fastener.

20. The method of claim 19, wherein providing a fastener includes providing a fastener having a detectable marker; and wherein detecting a latched position of the fastener includes detecting, with the inspection device, the presence of the detectable marker within a target range longitudinally beneath the accessible surface.

21. The apparatus of claim 11, wherein the detectable marker is located at a portion of the component which is directly longitudinally adjacent to the concealing surface of the substrate.

22. The apparatus of claim 9, wherein the component includes a detectable marker, and the detectable marker is located laterally within the component-accepting structure when the component is in the activated position.

* * * * *